United States Patent Office 3,790,483
Patented Feb. 5, 1974

3,790,483
LUBRICATING OILS CONTAINING A VINYL AROMATIC, $C_2$ TO $C_8$ OLEFIN AND $C_{12}$ TO $C_{20}$ OLEFIN TERPOLYMER
W. R. Song, Maplewood, and Norman Jacobson, East Brunswick, N.J., assignors to Esso Research and Engineering Company
No Drawing. Filed June 28, 1972, Ser. No. 267,211
Int. Cl. C01m 1/38
U.S. Cl. 252—59  7 Claims

ABSTRACT OF THE DISCLOSURE

An oil-soluble terpolymer, useful as a viscosity index improver and pour point depressant for lubricating oils, is made by a Ziegler-Natta synthesis, preferably hydrogen moderated, from monomers comprising 2 to 50 mole percent of a vinyl aromatic hydrocarbon; from 1 to 49 mole percent of a $C_2$–$C_8$ straight-chain $\alpha$-olefin; and 10 to 97 mole percent of a substantially linear $C_{12}$–$C_{20}$ $\alpha$-olefin having not less than 9 unsubstituted methylene radicals in a straight chain following the olefinic carbon atoms. The terpolymer is amorphous in structure as determined by X-ray and differential thermal analyses, is essentially free of olefinic unsaturation and has a number average molecular weight equal to or greater than 10,000.

BACKGROUND OF THE INVENTION

Field of the invention

This invention relates to lubricating oil compositions comprising a major proportion of a lubricating oil and a minor proportion of an oil-soluble hydrocarbon polymer. More particularly, the invention is concerned with a polymeric additive which possesses pour point depressing and viscosity index improving properties when admixed with lubricating oil and has good oxidative and thermal stability.

The polymer, e.g. terpolymer, can be prepared by a Ziegler-Natta synthesis, preferably hydrogen moderated, from monomers comprising: a vinyl aromatic hydrocarbon having a total of 8 to 20 carbon atoms; a $C_2$–$C_8$ straight-chain alpha-olefin; and a substantially linear $C_{12}$–$C_{20}$ alpha-olefin having not less than 9 unsubstituted methylene radicals in a straight chain, following the olefinic carbon atoms.

Structurally, the terpolymer may be illustrated as a randomly distributed addition polymer having the following monomer moieties:

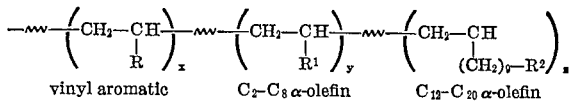

wherein R is a mono or polynuclear aryl, or alkyl substituted arylene, radical having a total of from 6 to 18 carbon atoms; $R^1$ is selected from hydrogen, a methyl radical or a straight-chain $C_2$ to $C_6$ alkyl radical; $R^2$ is a straight-chain or methyl substituted straight-chain alkyl radical of from 1 to 9 carbon atoms and $x$, $y$ and $z$ are integers in the range of from 1 to about 50. The polymer is amorphous, i.e., shows essentially a zero crystalline content when analyzed by the method of Ver Strate and Wilchinsky: Journ. Polymer Science 9, 127 (1971).

DESCRIPTION OF THE PRIOR ART

U.S. Pat. 3,157,624 discloses the preparation of a copolymer of one mole of styrene, or an alkyl substituted styrene, with from 4 to 14 moles of a $C_{10}$–$C_{20}$ straight-chain alpha-olefin in a molecular weight range of 100,000 to 1,000,000 using a hydrogen moderated Ziegler-Natta synthesis. While this prior art polymer performs satisfactorily when used alone, problems of compatibility arise when it is admixed with other polymers such as the ethylene-higher olefin, e.g. propylene, copolymers described for example in U.S. Pats. 3,522,180 and 3,551,336. Ethylene-propylene copolymers have become commercially available as lubricating oil V.I. improvers because of their low cost and good effectiveness. In general, these ethylene-propylene copolymers comprise about 40 to 83 wt. percent ethylene, having a weight average molecular weight in the range of 10,000 to 200,000; a $M_w/M_n$ ratio preferably less than about 7.0, e.g. 4.0, and a degree of crystallinity of less than 25%. One problem with these ethylene-propylene copolymers has been compatibility with other polymeric additives, particularly pour point depressants.

If styrene-$\alpha$-olefin copolymers, such as those of U.S. 3,157,624, is mixed with the ethylene-propylene copolymers, such as those of U.S. Pats. 3,522,180 and 3,551,336, in oil and stored at elevated temperatures, the styrene-$\alpha$-olefin copolymer tends to cause the ethylene-propylene copolymers, especially those having a high ethylene content or a significant crystalline content, to drop out of solution. However, the polymer of the instant invention is compatible with the ethylene-propylene copolymers described above.

SUMMARY OF THE INVENTION

Oil-soluble, amorphous terpolymers particularly useful as viscosity index improvers and pour point depressants when compounded in lubricating oils in a minor amount, e.g. 0.5 to 10.0, usually 0.5 to 5.0 wt. percent, based on the total composition, have been prepared from monomers comprising 2 to 50, preferably 5 to 45, mole percent of a nuclear substituted vinyl aromatic hydrocarbon having a total of 8 to 20 carbon atoms; 1 to 49, preferably 5 to 40, mole percent of a $C_2$ to $C_8$ straight-chain alpha-olefin; and 10 to 97, preferably 20 to 80, mole percent of a $C_{12}$ to $C_{20}$ substantially linear alpha-olefin having not less than 9 unsubstituted methylene radicals in a straight chain following the olefinic carbon atoms by means of Ziegler-Natta catalysts. A moderator, such as hydrogen, is used in the polymerization to control and achieve the desired molecular weight. The polymers of this invention are further characterized by a random distribution of monomer moieties in the polymer chain, substantial absence of either olefinic unsaturation or crystallinity, and a number average molecular weight in the range of 10,000 to 200,000, e.g. 20,000 to 120,000.

In contrast to styrene-olefin polymers of the prior art, the terpolymers of the instant invention are compatible with other polymeric hydrocarbon viscosity index improvers, especially ethylene-$\alpha$-olefin copolymers having a high ethylene content, e.g. 55 to 80 wt. percent ethylene, or a significant degree of crystallinity, e.g. 3 to 25%, which may be present in a minor amount, e.g. 0.5 to 10 wt. percent. The compatibility is most marked when lubricant compositions containing both types of viscosity index improvers are stored at elevated temperatures for an extended period of time.

DESCRIPTION OF THE PREFERRED EMBODIMENTS

The production of high polymers from olefins using Ziegler-Natta catalysts is well-known in the art and has been recently reviewed by G. Natta et al. in "Polymer Chemistry of Synthetic Elastomers," Chapter 7, p. 679ff, edited by Kennedy & Tornqvist, 1969, Interscience, New York.

The catalyst compositions consist of a transition metal compound from Groups IV$b$, V$b$ and VI$b$ of the Periodic Table of the Elements, particularly compounds of titanium and vanadium, which compounds are designated as primary catalysts, and organometallic reducing compounds from Groups II$a$, II$b$ and III$d$, particularly organoaluminum compounds which are designated as cocatalysts.

Monomers useful for the practice of this invention comprise:

(1) Nuclear substituted vinyl mono or polynuclear aromatic compounds having the general formula $$CH_2=CH-R$$

wherein R is selected from the group consisting of $C_6$ to $C_{18}$ mono or polynuclear aryl, or alkyl substituted, arylene radicals. Examples of suitable vinyl aromatic compounds include: styrene, 4-methyl styrene, 4-ethyl styrene, 4-n-propyl styrene, 4-isopropyl styrene, 4-n-butyl styrene, 4-tert.-butyl styrene, 1-vinyl-4-methyl naphthalene, 1-vinyl-4-n-hexyl naphthalene, etc.

(2) Straight-chain $C_2$ or $C_8$ alpha-olefins having the general formula $CH_2=CH-R^1$ wherein $R^1$ is selected from the group consisting of hydrogen, a methyl radical or a straight chain $C_2$ to $C_6$ alkyl radical. Suitable olefins are: ethylene, propylene, butene-1, pentene-1, hexene-1, heptene-1, and octene-1.

(3) Substantially linear, $C_{12}$ to $C_{20}$ alpha olefins having the general formula $CH_2=CH-(CH_2)_9-R^2$ wherein $R^2$ is selected from the group consisting of a methyl radical, a $C_2$ to $C_9$ straight-chain alkyl radical and a $C_2$ to $C_9$ alkyl radical having side-chain branching no longer than a methyl radical. Suitable olefins include dodecene-1, tridecene-1, tetradecene-1, pentadecene-1, hexadecene-1, heptadecene-1, octadecene-1, nonadecene-1, eicosene-1, 13,13-dimethyl tetradecene-1 and 12,12-dimethyl hexadecene-1. Mixtures of two or more of the above classes of monomers can be used, e.g. two $C_{12-20}$ alpha olefins, etc.

While all of the above monomers are suitable for the practice of this invention, most preferred for reasons of economy are styrene, hexene-1 and tetradecene-1. The advantage of adding a lower olefin to the higher olefins in producing terpolymers with styrene, compared to the copolymers of the prior art, is illustrated in the results of the ten experiments given in Table I.

Experiments 1 to 10: Experiments 1 to 3 inclusive are illustrative of the products disclosed in the prior art. Experiments 4 to 10 illustrate the products obtained in accordance with this invention.

Freshly redistilled monomers, maintained under oxygen-free nitrogen were used in all the experiments. Toluene, used as a solvent in the synthesis of the polymers, was dried azeotropically and also kept under nitrogen. The primary catalyst used in all of the experiments was a product commercially available from Staaffer Chemical Company as AA catalyst. The AA catalyst has the formula $(TiCl_3)_3 \cdot AlCl_3$ and is made by the reduction of 3 moles of $TiCl_4$ with one mole of aluminum. It is a finely ground, or milled, purple powder, has a molecular weight of 596.15, sublimes at 225° C. and shows a close packed hexagonal cubic crystal structure by X-ray analysis. The cocatalyst used in all of the experiments was aluminum tri-n-propyl $Al(n-C_3H_7)_3$. The same quantities of catalyst, cocatalyst, and diluent was used in all of the experiments.

As a further illustration of these experiments, Experiment No. 8 (shown in Table I) which is typical, is now described in detail. A reaction flask fitted with a stirrer, thermometer, reflux condenser, hydrogen inlet tube, dropping funnel vented back to the flask and heating mantle was thoroughly dried and transferred to a dry-box in which was maintained an oxygen-free atmosphere of dry nitrogen. To the flask was added 0.84 gram of the AA catalyst, 0.81 ml. of the aluminum tripropyl cocatalyst and 120 ml. of dry, purified toluene. While a slow stream of hydrogen was bubbled through the mixture, the flask contents were heated to 70° C. and maintained at this temperature for one-half hour to age the catalyst mixture. At the end of the half-hour, one-third (58 ml.) of a monomer solution previously added to the dropping funnel, consisting of 58.8 grams (0.30 mole) of tetradecene-1, 8.48 grams (0.10 mole) of hexene-1 and 10.48 grams (0.10 mole) of styrene diluted to 174 ml. with purified toluene, was added with stirring. A second 58 ml. was added at the end of one hour and the last portion was added at the end of one and one-half hours. When the monomer addition was complete, stirring, heating at 70° C. and hydrogen addition was continued for an additional two hours. The catalyst was inactivated by the addition of anhydrous isopropyl alcohol in heptane and the polymer precipitated by the addition to a large volume of methanol. The filtered polymer was separated from any polystyrene by resolution in hexane, filtration from insolubles and reprecipitation with methanol. The dried polymer weighed 45.4 gms. representing a yield of 58.4 wt. percent based on the weight of the starting monomers. The styrene content of the polymer was determined by nuclear magnetic resonance (NMR) analysis.

Portions of the polymers of Experiments 1 to 10 were dissolved at the concentrations and in the oils shown in Table I and the viscosity index, pour point and sonic breakdown determined. In all instances, the polymers of the instant invention (Experiments 4 to 10), containing lower olefins yielded lower pour points and/or suffered less sonic breakdown than the products of the prior art (Experiments 1 to 3), made only with higher olefins. The shear stability of a polymer in oil as measured by sonic breakdown is well known in the lubricant art and has been described, for example, in U.S. Pat. 3,157,624.

The specific polymers prepared and their test results are summarized in Table I, which follows:

TABLE I.—SYNTHESIS AND INSPECTIONS OF STYRENE-OLEFIN POLYMERS [1]

| Experiment No. | Monomer in feed, mols. | | | Yield of polymer, wt. percent | Molecular percent styrene in polymer by NMR | Intrinsic viscosity [1] |
|---|---|---|---|---|---|---|
| | α-$C_{14}$⁻ | Styrene | α-$C_6$⁻ | | | |
| 1 | 0.4 | 0.1 | None | 54.3 | | 0.37 |
| 2 | 0.3 | 0.2 | None | 50.1 | | 0.30 |
| 3 | 0.54 | 0.05 | None | 52.9 | | 0.34 |
| 4 | 0.26 | 0.02 | 0.01 | 61.1 | | 0.27 |
| 5 | 0.45 | 0.025 | 0.025 | 84.5 | | 0.35 |
| 6 | 0.40 | 0.05 | 0.05 | 70.9 | | 0.27 |
| 7 | 0.425 | 0.05 | 0.05 | 69.3 | 4.4 | 0.28 |
| 8 | 0.30 | 0.10 | 0.10 | 58.4 | 10.0 | 0.25 |
| 9 | 0.20 | 0.20 | 0.10 | 63.3 | 22.0 | 0.24 |
| 10 | 0.10 | 0.20 | 0.20 | 73.3 | | 0.24 |

TABLE I—Continued

| Experiment No. | Wt. percent polymer in blend [2] | Kinematic viscosity cs. at— | | Viscosity index | Viscosity at 0° F. poise | Percent viscosity loss by sonic breakdown | Pour point, °F.[3] |
|---|---|---|---|---|---|---|---|
| | | 210° F. | 100° F. | | | | |
| 1 | 2.02 | 12.22 | 81.63 | 134.5 | 19.2 | 51.0 | −10 |
| 2 | 2.62 | 12.26 | 78.05 | 138.3 | 19.8 | 48.4 | −10 |
| 3 | 2.30 | 12.38 | 83.13 | 134.5 | 19.5 | 52.5 | −10 |
| 4 | 2.82 | 12.20 | 81.42 | 134.6 | 19.9 | 42.6 | −10 |
| 5 | 2.27 | 12.51 | 83.25 | 135.2 | 19.2 | 52.6 | −15 |
| 6 | 3.00 | 12.52 | 85.10 | 133.2 | 19.7 | 42.5 | −20 |
| 7 | 2.70 | 12.28 | 82.25 | 123.2 | 19.7 | 44.2 | −15 |
| 8 | 3.08 | 12.38 | 83.85 | 133.2 | 20.9 | 35.1 | <−30 |
| 9 | 3.15 | 12.21 | 82.60 | 133.8 | 21.6 | 32.8 | −25 |
| 10 | 3.22 | 12.23 | 83.00 | 131.8 | 21.9 | 31.9 | −25 |

[1] Intrinsic viscosity calculated from the formula $[\eta] = (2\eta_{sp.} - 2 \ln \eta_{rel.}) \cdot .5/C$ where, $\eta_{sp.} = \eta_{obs.} - \eta_{solvent}/\eta_{solvent}$, $\eta_{rel.} = \eta_{obs.}/\eta_{solvent}$, and $C$ = polymer concentration in gm./100 ml. solvent. These viscosities show that the polymers have number average molecular weights between about 50,000 and 100,000.

[2] In solvent extracted neutral mineral lubricating oil. Viscosity at 210° F. = 6.2 cs.; V.I. 109, ASTM pour point = 0° F.

[3] ASTM pour point of 0.1 wt. percent in mineral lubricating oil having viscosity at 210° of 44.0 SUS, 0° F. pour point.

Experiment 11: The product of Experiment 9 as one embodiment of this invention was compared with the product of experiment 2 as a representative of the prior art styrene-higher olefin polymers and with two commercial viscosity index improvers in a Laboratory Multiple Oxidation Test (LMOT). In this test which measures the resistance of a lubricant to oxidation and sludge formation, a 400 gram sample of the compounded oil to which has been added 2.5 grams of iron filings, a 19 inch length of No. 14 gauge copper wire and a sanded aluminum strip measuring ¼″ x 12″ x 1/16″ is heated to either 325° F. for 5 days or 300° F. for 7 days while a stream of air is bubbled through the oil at a rate of 25 ml. per minute. Breakdown of the oil is estimated by means of a blotter test, total acid number (TAN) at the end of the test, the presence of sludge in the oil and the formation of a varnish film on the aluminum strip.

For test purposes, the polymers were compounded into fully formulated automotive automatic transmission fluids in a solvent extracted mineral lubricating neutral oil having a viscosity at 210° F. of 44.0 SUS; viscosity at 100° F. of 155 SUS and pour point of 0° F. to which had been added a detergent-inhibitor combination comprising on a weight basis a mixture of: 2% polyisobuylene succinic anhydride-tetraethylene pentamine condensation product; 0.3% phosphosulfurized terpene; 0.3% zinc dialkyl dithiophosphate; 0.3% naphthylamine and a silicone antifoamant. The results obtained are given in Tables II and III.

TABLE II

[LMOT at 300° F.]

| Test/polymer | Commercial product— | | Product of experiment— | |
|---|---|---|---|---|
| | No. 1 [1] | No. 2 [2] | No. 2 | No. 9 |
| Polymer concentrate wt. percent | 1.2 | 5.0 | 2.0 | 2.0 |
| Break time—days [3] | 7 | 5 | 5 | 7 |
| TAN [4] | 1.5 | 6.0 | 4.9 | 2.8 |
| Sludge rating | None | Heavy haze | Trace | Trace |
| Varnish | do | None | None | None |

[1] Commercial Product 1 is a random copolymer consisting of a major proportion of $C^{10}$ to $C^{20}$ alkyl methacrylate monomers and a minor proportion of a nitrogen-containing monomer copolymerized with the aid of a free radical catalyst. It has a nitrogen content of 0.2 wt. percent and a weight average molecular weight in the range of 100,000 and 200,000.

[2] Commercial Product 2 is an oil-soluble polymer of polyisobutylene having a number average molecular weight of about 60,000 which is widely used as a V.I. improver.

TABLE III

[LMOT at 325° F.]

| Test/polymer | Commercial product No. 1 [3] | Product of experiment No. 9 |
|---|---|---|
| Polymer concentrate wt. percent | 1.2 | 2.0 |
| Break time—days [4] | 5 | 3 |
| TAN [4] | 6.9 | 7.8 |
| Sludge rating | Light | Haze |
| Varnish | None | Slight |

[3] TAN is the total acid number of the oxidized oil at the termination of the test.

[4] Break time is the time in days when a drop of the oxidized oil placed on a dense white blotter having a thickness of 0.025 inch "breaks through" to the opposite side.

It will be noted that the product of this invention gave superior results to Commercial Product 2 and the styrene-α-olefin copolymer of the prior art, and was about comparable to Commercial Product No. 1.

Experiment 12: Two blends were prepared for storage tests at elevated temperature in order to compare the compatibility of the products of the instant invention, and the products of the prior art, with Commercial Product No. 3.

Commercial Product 3 is an oil-soluble, partially crystalline copolymer of ethylene and propylene containing 75 wt. percent of ethylene; a crystalline content of about 5 wt. percent; a weight average molecular weight of about 80,000, and a number average molecular weight of about 40,000, made by a hydrogen moderated Ziegler-Natta synthesis. Each blend contained 10% by wt. of Commercial Product No. 3, to which was added in the one case, 1% by wt. of Experimental Product No. 9 and in the other 1% by wt. of Experimental Product No. 2. Both samples were stored at 140° F. and periodically examined for homogeneity. Layer formation with precipitation of product occurred with the Experimental Product No. 2 in less than a week, whereas no evidence of separation was visible with Experimental Product No. 9 after two months.

Consideration of the above data shows a distinct advance for the product of this invention over the products of the prior art. The inclusion of from 1 to 49 mol. percent of $C_2$ to $C_8$ olefin in the polymer and a lower molecular weight, increased solubility and compatibility with higher molecular weight polymers having a high ethylene content and significant degree of crystallinity, and also gave a low pour point when added to oils and an improved resistance to oxidation.

It will be evident from Experiments 11 and 12 that the products of this invention may be compounded in lubricants with other viscosity index improvers, antioxidants, dispersants, oiliness agents, antiwear agents, antifoamants and the like, familiar to those having skill in the lubricant art, without departing from the spirit of this invention.

The polymers of the invention can be used in mineral lubricating oils, and also in synthetic oils to thereby form automotive crankcase lubricants, aircraft engine lubricants, gear oils, transmission fluids, etc. The mineral lubricating oils can be of any usual type, including those derived from the ordinary paraffinic, naphthenic, asphaltic, or mixed base mineral crude oils by suitable refining methods. Suitable synthetic oils include synthetic hydrocarbon lubricating oils, as well as dibasic acid esters such as di-2-ethyl hexyl sebacate, carbonate esters, phosphate esters, halogenated hydrocrabons, polysilicones, polyglycols, glycol esters such as $C_{13}$ oxo acid diesters of tetraethylene glycol, and complex esters, as for example the complex ester formed by the reaction of 1 mole of sebacic acid with 2 moles of tetraethylene glycol and 2 moles of 2-ethyl hexanoic acid.

While the lubricant compositions herein described are primarily designed as internal combustion engine crankcase lubricants, the additives of the invention may also be employed in other oil compositions, including turbine oils, various industrial oils, gear oils, hydraulic fluids, transmission fluids and the like.

Concentrate comprising a minor proportion, e.g. 5 to 50 wt. percent of the polymer in a major amount of oil, e.g. 95 to 50 wt. percent oil, preferably a lubricating oil as mentioned above, e.g. mineral lubricating oil, with or without other additives present, can also be prepared for ease of handling.

What is claimed is:

1. A lubricating oil composition comprising a major proportion of lubricating oil and a minor V.I. improving proportion of a V.I. improving and pour depressing oil soluble, substantially amorphous terpolymer having a degree of crystallinity of less than 25%, a number average molecular weight in the range of about 10,000 to 200,000 and comprising essentially about 2 to 50 mole percent of a nuclear substituted vinyl aromatic hydrocarbon having a total of 8 to 20 carbon atoms of the general formula: $CH_2=CH-R$ wherein R is selected from the group consisting of $C_6$ to $C_{18}$ mono and dinuclear aryl and alkyl substituted arylene radicals, about 1 to 49 mole percent of a lower straight chain alpha-olefin having 2 to 8 carbon atoms, and 10 to 97 mole percent of a $C_{12}$ to $C_{20}$ substantially linear alpha-olefin having not less than nine unsubstituted methylene radicals in a straight chain following the olefinic carbon atoms.

2. Composition according to claim 1, wherein said lubricating oil is a mineral oil, said minor amount is in the range of 0.5 to 10 wt. percent, said molecular weight is in the range of 20,000 to 120,000, and said terpolymer comprises about 5 to 45 mole percent of said vinyl aromatic, about 5 to 40 mole percent of said lower alpha-olefin and about 20 to 80 mole percent of $C_{12}$ to $C_{20}$ linear alpha-olefin.

3. Composition according to claim 2, wherein said vinyl aromatic hydrocarbon is styrene and said lower olefin is selected from the group consisting of ethylene, propylene, butene-1, pentene-1 and hexene-1.

4. Composition according to claim 3, wherein said terpolymer is made by a hydrogen moderated Ziegler-Natta synthesis from styrene, hexene-1 and tetradecene-1.

5. A lubricating oil composition according to claim 1, which further contains a minor proportion of an ethylene-propylene copolymer V.I. improver.

6. A composition according to claim 5, wherein said vinyl aromatic is styrene, said lower alpha-olefin is hexene-1, said $C_{12}$ to $C_{20}$ alpha-olefin is tetradecene-1 and said ethylenepropylene copolymer contains about 75 wt. percent of ethylene, has a crystalline content of about 5 wt. percent, a weight average molecular weight of about 80,000 and a number average molecular weight of about 40,000.

7. A composition according to claim 6, wherein said composition contains about 0.5 to 10 wt. percent of said terpolymer and about 0.5 to 10 wt. percent of said ethylene-propylene copolymer.

References Cited
UNITED STATES PATENTS

| | | | |
|---|---|---|---|
| 3,157,624 | 11/1964 | Vries et al. | 252—95 X |
| 3,522,180 | 7/1970 | Sweeney et al. | 252—59 |
| 3,551,336 | 12/1970 | Jacobsson et al. | 252—59 |
| 2,683,138 | 7/1954 | Goering et al. | 252—59 |
| 3,598,738 | 8/1971 | Biswell et al. | 252—59 |

WARREN H. CANNON, Primary Examiner

W. CANNON, Assistant Examiner

U.S. Cl. X.R.

252—80.78